R. A. GALLY.
MUSIC ROLL GEARING.
APPLICATION FILED AUG. 18, 1917.
1,262,610.
Patented Apr. 9, 1918.
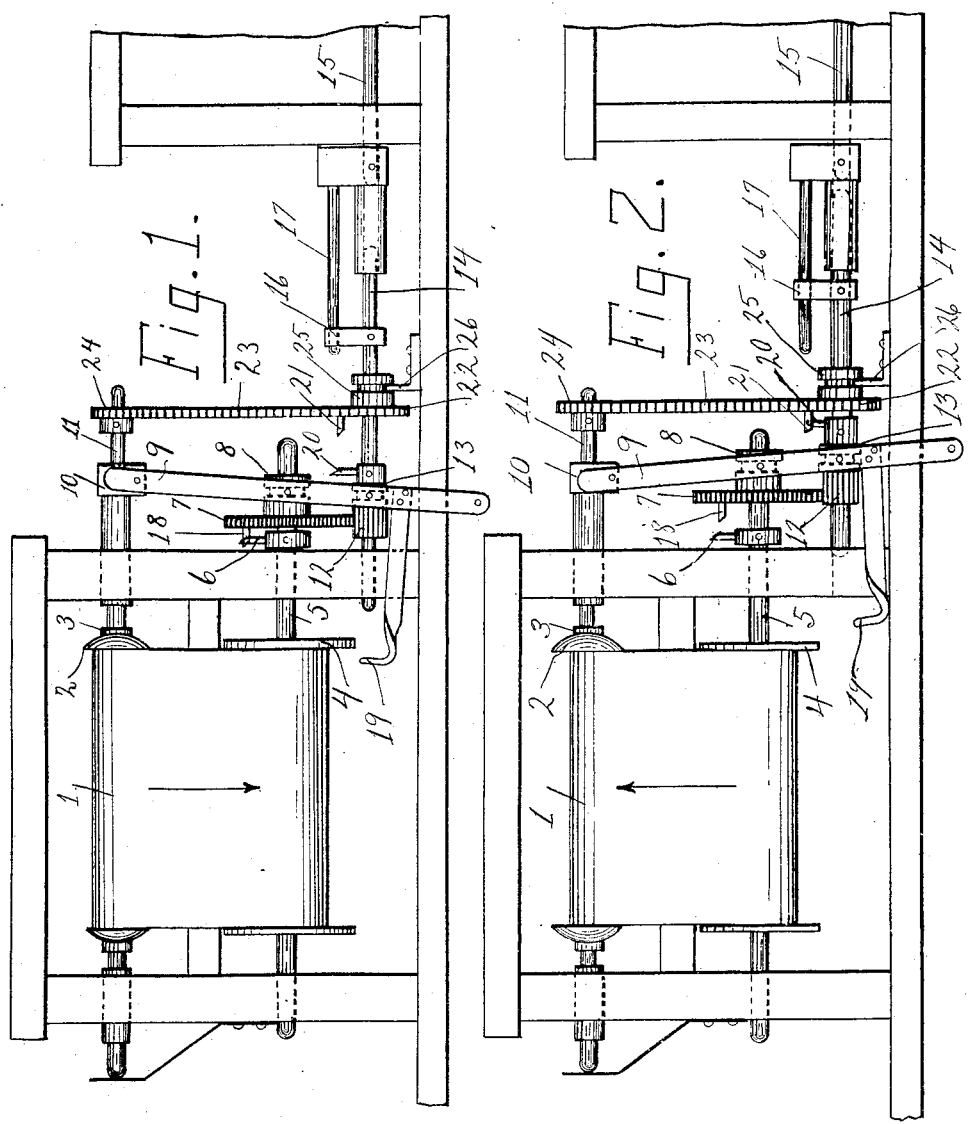

UNITED STATES PATENT OFFICE.

ROBERT A. GALLY, OF CINCINNATI, OHIO, ASSIGNOR TO THE BALDWIN COMPANY, OF CINCINNATI, OHIO.

MUSIC-ROLL GEARING.

1,262,610.  Specification of Letters Patent.  Patented Apr. 9, 1918.

Application filed August 18, 1917. Serial No. 186,981.

*To all whom it may concern:*

Be it known that I, ROBERT A. GALLY, a citizen of the United States, and residing at Cincinnati, in the county of Hamilton and State of Ohio, have invented certain new and useful Improvements in Music-Roll Gearing, of which the following is a specification.

Various arrangements of the gears and reverse shifters have previously been made for the winding and rewinding of music sheets on rolls, most of them employing a drive pinion thrown in and out of the large gear of the take up spool for connecting or disconnecting the driving of the said spool, such in and out motion causing a "smashing" of the teeth after some use, therefore several improved forms have been devised to avoid such "smashing" of gears by having the pinion and gear in constant mesh and clutching and unclutching the forward and rear driving by means other than meshing and unmeshing the gear teeth; but these improved devices have the fault of a high speed idle drive of the pinion from the gear during rewinding, or a pinion loose on its shaft, and therefore liable to loose running, or both said faults, as in Arno, #596,768, January 4, 1898, while in the present invention the pinion is solid on its shaft and always runs at low speed and into the gear.

In the drawings Figure 1 is a front view of a music roll box with the gears etc. in position for forward winding of a music sheet; and Fig. 2 is a similar view of the same parts in position for the rewinding of a music sheet.

A music sheet 1 has the usual roll 2 therewith adapted to be engaged by and revolved with a clutch spindle 3. A take-up spool 4 has the usual means for temporary attachment of the forward end of the music sheet 1, and this spool 4 has its shaft 5 extended therefrom and a clutch 6 affixed thereto. A gear wheel 7 is loosely mounted on the spool shaft 5 and this gear wheel 7 has attached thereto a grooved collar 8, the groove of which is engaged by a pin or lug on the shift lever 9, which shift lever 9 is suitably pivoted at its upper end on the fixed bearing hub 10 of the spindle 11 of clutch 13 or other fixed part of the apparatus. A pinion 12 and a suitable collar 13 are both fixed to a revoluble drive shaft 14, the groove of the collar 13 being engaged by a pin or lug of the shift lever 9, the right end of shaft 14 extending into a constant revoluble engagement with the motor shaft 15 of any suitable motor, such as the usual wind or clock motor of player devices. The engagement of drive shaft 14 and motor shaft 15 is by means of their respective clutches 16 and 17, which, while insuring the revolution of drive shaft 14 whenever the motor shaft 15 is revolved, allows the lengthwise movement of drive shaft 14 by action of the shift lever 9, thereby enabling the engagement of the clutch pin 18 on the gear wheel 7 with the clutch 6 of the spool shaft 5, when the shift lever 9 is moved to the extreme left by the handle 19, the engagement of said two clutches 18 and 6 enabling the revolution of the shaft 5 and its spool 4 from the drive shaft 14 through pinion 12 meshed with the gear 7. When the handle 19 is shoved to the right by the person using the apparatus, as in Fig. 2, the shift lever 9 is moved to the right and the shaft 14 and clutch 20 fixed with said shaft 14 then engages the clutch 21 of the sprocket wheel 22, thereby causing said sprocket wheel 22 to revolve and through chain 23 revolve the small sprocket wheel 24 which is fixed on spindle 11 of the clutch 3, thus causing the said clutch spindle 11 and clutch 3 to revolve and turn the roll 2 and rewind the music sheet 1 on said roll 2 ready for repeating or for removal from the apparatus. A grooved collar 25 is attached to the sprocket wheel 22 and both the collar 25 and the wheel 22 are free in the shaft 14, and a guide 26 is fixed to a permanent part of the apparatus and at its outer end is engaged in the groove of the said collar 25 to keep the sprocket wheel 22 in proper line for the chain 23 from sprocket wheel 22 to the small sprocket 24.

What I claim as my invention is:—

1. A take-up spool and a shaft therewith; a clutch fixed with the said shaft; a gear wheel loosely mounted on the said shaft and slidable thereon; a clutch fixed with the said gear and adapted to be engaged and disengaged with the clutch on said shaft; a pinion engaging the said gear, and a shaft centered with and fastened to the said pinion and parallel to the spool shaft; a shift means fixed with the said gear wheel, and a shift means fixed with the said pinion shaft, and a common shifter means engaging both said shift means and adapted to slide the gear into and out of clutch with the clutch on the spool shaft, and at the same time slide the pinion shaft and pinion.

2. A take-up spool and a shaft therewith; a clutch fixed with the said shaft; a gear wheel loosely mounted on the said shaft and slidable thereon; a clutch fixed with the said gear and adapted to be engaged and disengaged with the clutch on said shaft; a pinion engaging the said gear, and a shaft centered with and fastened to the said pinion and parallel to the spool shaft; a shift means fixed with the said gear wheel, and a shift means fixed with the said pinion shaft; and a common shifter means engaging both said shift means and adapted to slide the gear into and out of clutch with the clutch on the spool shaft, and at the same time slide the pinion shaft and pinion in the same direction.

3. A take-up spool and a shaft therewith; a clutch fixed with the said shaft; a gear wheel loosely mounted on the said shaft and slidable thereon; a clutch fixed with the said gear and adapted to be engaged and disengaged with the clutch on said shaft; a pinion engaging the said gear, and a shaft centered with and fastened to the said pinion and parallel to the spool shaft; a shift means fixed with the said gear wheel, and a shift means fixed with the said pinion shaft; and a common shifter means engaging both said shift means and adapted to slide the gear into and out of clutch with the clutch on the spool shaft, and at the same time slide the pinion shaft and pinion in the same direction but to different extents of sliding motion of the gear and the pinion.

4. A take-up spool and a shaft therewith; a clutch fixed with the said shaft; a gear wheel loosely mounted on the said shaft and slidable thereon; a clutch fixed with the said gear and adapted to be engaged and disengaged with the clutch on said shaft; a pinion engaging the said gear, and a shaft centered with and fastened to the said pinion and parallel to the spool shaft; a shift means fixed with the said gear wheel, and a shift means fixed with the said pinion shaft; and a common shifter means engaging both said shift means and adapted to slide the gear into and out of clutch with the clutch on the spool shaft, and at the same time slide the pinion shaft and pinion; and a sprocket wheel loose on the pinion shaft and a clutch on the said sprocket wheel, and a clutch fixed with the said pinion shaft and adapted to be engaged by the clutch on the said sprocket wheel only when the clutch on the gear wheel is disengaged from the clutch on the spool shaft.

5. A take-up spool and a shaft therewith; a clutch fixed with the said shaft; a gear wheel loosely mounted on the said shaft and slidable thereon; a clutch fixed with the said gear and adapted to be engaged and disengaged with the clutch on said shaft; a pinion engaging the said gear, and a shaft centered with and fastened to the said pinion and parallel to the spool shaft; a shift means fixed with the said gear wheel, and a shift means fixed with the said pinion shaft; and a common shifter means engaging both said shift means and adapted to slide the gear into and out of clutch with the clutch on the spool shaft, and at the same time slide the pinion shaft and pinion; and a sprocket wheel loose on the pinion shaft and a clutch on the said sprocket wheel, and a clutch fixed with the said pinion shaft and adapted to be engaged by the clutch on the said sprocket wheel only when the clutch on the gear wheel is disengaged from the clutch on the spool shaft, and a guide means adapted to hold the said sprocket wheel to one position in the line of its axis.

6. A support block having a plurality of horizontal spindles therewith and transmission means on said spindles, and an individual hub bearing for one of said spindles, the said hub fixed with the said support block; a shifting means on another of the said spindles; and a swingable shifter lever engaging said shifting means and having a pivot bearing in the said individual hub bearing.

7. A support block having a plurality of horizontal spindles therewith, and positioned one above another, and transmission means on said spindles; an individual hub bearing for the upper one of the spindles, the said hub bearing separately fixed with the said support block; and a swingable shifter lever having a pivot bearing in the said upper spindle bearing hub, and shiftable parts mounted on the lower one of said spindles and engaged by said shifter lever.

8. A support block having a spindle mounted therewith and a shifter means slidable longitudinally along the axis of the said spindle, a shift lever pivotally mounted to one side of the said block at the upper part of the said shift lever, and a handle rigid with and horizontally extended from a lower part of the said shift lever beyond the opposite side of the said block, and engaging means connecting the said shift lever to the said shifter means.

9. A support block having a spindle mounted therewith and a shifter means slidable longitudinally along the axis of the said spindle, a shift lever pivotally mounted to one side of the said block at the upper part of the said shift lever, and a handle rigid with and horizontally extended from a lower part of the said shift lever beyond the opposite side of the said block, and engaging means connecting the said shift lever to the said shifter means, said engaging means being intermediate the pivoted part of the said shift lever and the horizontal line of the said handle.

ROBT. A. GALLY.

Witnesses:
 PAUL J. HENGGE,
 MARY I. SPEISER.

Copies of this patent may be obtained for five cents each, by addressing the "Commissioner of Patents, Washington, D. C."